(12) United States Patent
Hofmann

(10) Patent No.: US 9,102,058 B2
(45) Date of Patent: Aug. 11, 2015

(54) METHOD AND APPARATUS FOR IMPLEMENTING A MANIPULATOR PROCESS

(71) Applicant: KUKA Roboter GmbH, Augsburg (DE)

(72) Inventor: Josef Hofmann, Wolferstadt (DE)

(73) Assignee: KUKA Roboter GmbH, Augsburg (DE)

( * ) Notice: Subject to any disclaimer, the term of this patent is extended or adjusted under 35 U.S.C. 154(b) by 141 days.

(21) Appl. No.: 13/769,666

(22) Filed: Feb. 18, 2013

(65) Prior Publication Data

US 2013/0218332 A1    Aug. 22, 2013

(30) Foreign Application Priority Data

Feb. 21, 2012   (DE) .......................... 10 2012 003 479

(51) Int. Cl.
*B25J 19/00* (2006.01)
*B25J 9/16* (2006.01)

(52) U.S. Cl.
CPC ............ *B25J 9/1651* (2013.01); *B25J 19/0004* (2013.01)

(58) Field of Classification Search
USPC ................ 701/245; 318/568.16, 574; 73/121, 73/862.08; 606/130; 901/20, 9, 1, 19; 188/72.4, 366; 700/245; 219/110, 108
See application file for complete search history.

(56) References Cited

U.S. PATENT DOCUMENTS

| | | | | |
|---|---|---|---|---|
| 4,928,047 A | * | 5/1990 | Arai et al. ................ | 318/568.16 |
| 5,355,743 A | * | 10/1994 | Tesar ......................... | 74/490.03 |
| 2003/0141155 A1 | * | 7/2003 | Daneryd et al. ........... | 188/267.1 |
| 2005/0007340 A1 | | 1/2005 | Kobayashi et al. | |
| 2005/0023894 A1 | | 2/2005 | Ushiyama et al. | |
| 2005/0108872 A1 | * | 5/2005 | Konrath et al. ............... | 29/831 |
| 2007/0124927 A1 | * | 6/2007 | Konrath et al. ............... | 29/832 |
| 2008/0086241 A1 | * | 4/2008 | Phillips et al. .................... | 701/2 |
| 2008/0116828 A1 | | 5/2008 | Horikoshi et al. | |
| 2009/0012532 A1 | * | 1/2009 | Quaid et al. ................. | 606/130 |
| 2010/0058850 A1 | * | 3/2010 | Ortmaier et al. ............... | 73/121 |
| 2010/0243344 A1 | * | 9/2010 | Wyrobek et al. ............... | 180/21 |

FOREIGN PATENT DOCUMENTS

| | | |
|---|---|---|
| CN | 1481298 A | 3/2004 |
| CN | 102150023 A | 8/2011 |

(Continued)

OTHER PUBLICATIONS

Chinese Patent Office; Examination Report in Chinese Patent Application No. 201310002293.2 dated Nov. 4, 2014; 19 pages.

(Continued)

*Primary Examiner* — Ronnie Mancho
(74) *Attorney, Agent, or Firm* — Wood, Herron & Evans, LLP

(57) ABSTRACT

A method for executing a manipulator process with at least two manipulator poses with a manipulator, in particular a robot, wherein the manipulator comprises at least one drive means having a motor and a brake, comprising the steps of:

(S10) Assuming a manipulator pose;

(S20) Stopping at least one drive means;

(S30) Closing at least one brake of this drive means;

(S40) Reduction of the energy supply to the drive means;

(S50) Increasing the energy supply to the drive means;

(S60) Opening the closed brake;

(S70) Assuming another manipulator pose.

15 Claims, 2 Drawing Sheets

(56) References Cited

FOREIGN PATENT DOCUMENTS

| | | |
|---|---|---|
| CN | 102666030 A | 9/2012 |
| DE | 102 96 748 T5 | 6/2005 |
| DE | 10 2008 027 754 A1 | 1/2009 |
| DE | 10 2008 021 671 A1 | 11/2009 |
| DE | 10 2008 061 172 A1 | 6/2010 |
| EP | 0 914 911 A2 | 5/1999 |
| EP | 1 267 234 A2 | 12/2002 |
| JP | 01-222877 A | 9/1989 |
| JP | 3213282 A | 9/1991 |
| WO | 2001/042049 A1 | 4/2011 |

OTHER PUBLICATIONS

Chinese Patent Office; Search Report in Chinese Patent Application No. 201310002293.2 dated Oct. 15, 2014; 2 pages.

* cited by examiner

METHOD AND APPARATUS FOR IMPLEMENTING A MANIPULATOR PROCESS

The present invention relates to a method and an apparatus for performing or controlling a manipulator process, whereby the manipulator comprises at least one drive means having a motor and a brake.

Manipulators, especially robots in industrial applications, frequently have trajectories, in which alternate motion phases and stop phases. During the motion phases, the manipulator moves on a track. During the stop phases, the manipulator remains in a pose, for example, while a welding spot is set or while waiting for a workpiece to be supplied. The hold phase is followed by another motion phase, which is again followed by a stop phase, etc. Other examples are painting or order-picking processes that are executed by such automated industrial robots.

During the stop phase, the manipulator is kept active by its drive so that power for the application of the holding force and keeping the brakes open is dissipated.

This need for energy causes increased energy consumption during the operation of the manipulator(s) and represents a significant impairment of efficiency of contemporary manipulator assemblies.

A typical measure for improving the efficiency is the weight balance in industrial robots as it is suggested in particular in EP 0 914 911 B1. Such balancing causes a reduction of the difference in the potential energy at different robot poses so that, preferably in the main axle of the robot, weaker drives and brakes are required to consume less energy with the same movements.

DE 103 940 302 T5 discloses a control system for closing and opening robot brakes depending on a distance between a stop and a moving part.

EP 1 974 870 A1 discloses a control system of a brake for industrial robots, wherein the brake is equipped with a switch for closing and opening, which allows a control of the brake independently of the other brakes.

The technical task of the present invention is to improve a manipulator process.

This task is achieved with a method having the features of claim 1. Claim 12 provides an apparatus for performing a protected method of the invention, claim 13 protects a computer program, which executes a process of the invention, claim 14 protects a computer program product, in particular a storage medium that has such a computer program. The dependent claims relate to preferred developments.

In an inventive method, a manipulator process, which comprises two or more manipulator poses, is executed by one or more manipulators, in particular by industrial robots. A manipulator is preferably movable in several degrees of freedom, in particular in four, six or seven degrees of freedom, wherein a degree of freedom is achieved in particular by an axle of the manipulator. One or more axes of the manipulator are respectively equipped with one or more drive means, which comprise one or more motors, and one or more brakes, and in particular at least one locking brake, i.e., a brake that closed without requiring any energy.

During a motion phase a manipulator pose is assumed. A manipulator process within the meaning of the present invention can comprise in particular a sequence of movements of the manipulator(s), hereinafter referred to as the "trajectory", and in particular its description. Additionally or alternatively, a manipulator process can comprise instructions, rules, and/or interfaces, in particular for activating a tool, for communication, and/or for the (re)-planning of the movement sequence. The trajectory can be represented in particular in a functional and/or tabular form, in particular in the manipulator control. A manipulator pose can in particular be pre-programmed and/or commanded by an operator, specified externally and/or generated during the manipulator process. A manipulator pose can in particular comprise a position and/or an orientation of the manipulator. A manipulator pose is preferably described by coordinates in, particularly Cartesian, working space of the manipulator or in the joint space of the manipulator, or represented as quaternions. Preferably, the trajectory is, in particular partially, predetermined up to a manipulator pose to be assumed. In particular, there can be realized by an interpolator a continuous or discrete target track, in particular in a functional and/or tabular form.

At the end of the motion phase, one or more drive means, preferably the entire manipulator, are stopped so that the axes defined by the stopped drive means no longer perform any movement. The standstill is preferably caused by the motors and/or by one or more closed brakes of the corresponding drive means. After the stopping or at the standstill, a holding force for the corresponding axle is provided solely by the motors until one or more closed brakes take over this holding power or at least part of this holding power. To present a more compact representation, in this case a rotation torque, i.e., an anti-parallel pair of forces, shall be referred to in a generalized manner as a force.

According to the invention after the shutdown or standstill, one or several, in particular all the brakes of one or more, in particular all of the drive means of the manipulator are closed. Likewise, one or more brakes of one or more drive means of the manipulator can be closed, while one or more brakes of another drive means, or another drive means are still open. With the brake(s) closed, the holding force, which is necessary and/or sufficient for the stop of the corresponding axle of the drive means, is impressed, partially or completely, by the brake(s). Correspondingly, after the closing of one or several brakes of one or more drive means, a power supply of this drive means is partially or completely reduced. Preferably, the electrical current for applying the holding force, which supplies the one or more motors with energy, is partially or completely reduced.

At the end of a stop phase, the power supply of at least one drive means is again increased, in particular so that the holding force previously generated by the brake or brakes of the driving means can be generated by one or several motors, and preferably so that the axes that are driven by the drive means can be moved according to the specified track or target.

After this increase of the power supply, one or more, in particular all the brakes of one or more, in particular all of the drive means of the manipulator are opened so that the manipulator can move again in the axes.

Thereafter a further manipulator pose, in particular on a target track, is assumed. In a preferred embodiment, at least one drive means of the manipulator is moved, while a brake of another drive means is closed.

A drive means within the meaning of the present invention comprises one or more motors and one or more brakes. Preferably, a drive means enables a movement and/or a delay of a manipulator axle, in particular by a degree of freedom. Additionally or alternatively, a drive means can include a casing, which at least partially surrounds the motor(s) and the brake(s) and delimits them from the ambient environment. Especially preferred are one or more drive means at least partially incorporated in a manipulator. A drive means can additionally or alternatively comprise a gear in order to gear up or gear down the torque provided by the motor. A drive means preferably comprises on its drive side and/or output side one or more sensors, in particular one or more position sensors, motion sensors and/or force sensors.

A motor within the meaning of the present invention can in particular be an electric motor. An electric motor can be in particular adapted for the conversion of electrical energy into mechanical energy. An electric motor is preferably operated with direct and/or alternating current, wherein the alternating current can have in particular a specific frequency and/or a certain amplitude. The electric motor is preferably designed as a brushless DC motor, synchronous motor or an asynchronous machine. In particular, a motor can have an electronic commutation. A motor is preferably equipped with an inverter and/or a PWM amplifier.

A brake within the meaning of the present invention is preferably used for applying a retaining torque or a portion of a holding force for holding a manipulator axle at its standstill. As explained above, in the present case, in particular also a torque is referred to in a generalized manner as a force.

Advantageously, the holding of one or more manipulator axes at a standstill by a brake requires less energy than by holding these manipulator axes or the corresponding motor or motors of the drive means. This results in an improvement in efficiency, when a stop is effected by such a brake and not, or not exclusively, by a motor. In addition, a brake to slow down the speed of the manipulator axle can be provided. A brake is preferably designed as a safety brake. A safety brake closes when a power supply falls below a threshold value and applies the appropriate holding force, in particular, without further supply of energy. Preferably, for closing at least one brake, power supply to the brake is completely interrupted. Such a brake results in a further improvement in efficiency at a standstill, if the manipulator is held by one or more brakes, and not by a motor. A brake can be especially designed as a spring-loaded brake, wedge brake, eddy current brake, electric motor brake, (permanent) magnetic brake, magnetic powder brake and/or as a pneumatic brake.

A power supply within the meaning of the present invention provides one or more, in particular all, drive means of one or more manipulators, in particular with electrical energy. The power supply can be fed from a, in particular public, energy grid and/or an autonomous energy source. Additionally or alternatively, a power supply can be provided from at least one battery assembly and/or an alternative energy storage, in particular a mechanical energy storage. Preferably a plurality of drive means, in particular, all the drive means of one or more manipulators are connected to a power supply. More preferably, the power supply comprises an intermediate circuit, which provides a DC voltage power for the motors, the brakes and/or other components of one or more drive means, in particular of one or more manipulators. The power supply is preferably connected to a controller. The power source is configured to reduce and/or to increase the power supply to one or more drive means, in particular to one or more motors and/or to one or more brakes of these drive means. Preferably, the power supply provides sufficient energy to operate one or more drive means, in particular preferably for the operation of one or more manipulators, and in particular together with additional peripherals, e.g., control system, safety cell, tool, illumination and/or communications devices.

In a preferred embodiment, the above-described steps are repeated once or more times so that the manipulator travels along a trajectory in two or more holding phases, during which one or more brakes are closed. This may be of particular advantage arising from using stop phases of various forms for energy savings.

In a preferred embodiment, the brake is closed and/or opened based on at least one of several criteria. According to a first aspect, the brake is closed and/or opened based on a state criterion. A state within the meaning of the present invention can be a physical state of the manipulator or an external device and/or a combination of several such states. Additionally or alternatively, a state may be characterized by a configuration of properties, in particular of the manipulator and/or an external device. Preferably, a state may be determined by a configuration of a state diagram and/or a flow control, which are used in particular, for the operation of a manipulator and/or an external device and, in particular, describe the status of a work flow. In particular, a state can be a state of a manipulator, a manipulator control system, a manipulator process, a tool of the manipulator, a control station and/or a device from the environment of the manipulator, which cooperates with the manipulator. A state criterion results in the advantage that in the event of a special configuration of the manipulator or the environment the brake can be closed and/or opened.

According to a second aspect of this embodiment, the brake is and/or opened based on a signal criterion. A signal for the purposes of the present invention can be, in particular, a sign with a particular meaning, which the signal receives preferably by a previously made agreement or by a prescription. In particular, a signal can communicate a certain piece of information. Such information can preferably include information about the manipulator, in particular about its components and/or external devices. Additionally or alternatively, such information can include data of a processing method. More preferably, a signal conveys information to a manipulator controller and/or an external control system. Additionally or alternatively, a signal contains information about the instructions of one or more operators, in particular a braking command and/or its state. Preferably, a signal contains information that people and/or objects are present in the danger area or in the area of the manipulators. In particular, a signal can contain information about the attention of an operator who is present in the vicinity, and for example, if the operator displays lack of attention, it can communicate a corresponding stop instruction. In particular, a signal can be a signal of a manipulator control system, a manipulator process, a tool controller, a control station and/or a device from the environment of the manipulator, which cooperates with the manipulator. A signal criterion results in particular in the advantage that the brake can be controlled by simply interpretable information, wherein this simple information can in particular represent a display of a more complex piece of information.

According to a third aspect of this embodiment, the brake is closed and/or opened on the basis of a time criterion. Time within the meaning of the present invention can be an absolute time or a relative time. Preferably, a time is a processing time of a process of the manipulator or an external device. Additionally or alternatively, a time can be a stop time, in particular a stop time that elapses from a stop of preferably one or a plurality of driving means of a manipulator and/or an external device. Preferably, a time is a time of pause. A pause time preferably describes the duration of a stop phase of a manipulator and/or an external device between two motion phases. A pause time can in particular describe the time period between the closing of a brake and the opening a brake. A time criterion advantageously provides the possibility of a close-open instruction by means of a single piece of information, in particular the duration of a stop phase.

According to a preferred embodiment, two or more criteria are evaluated in order to close and/or open the brake(s) of one or more drive means. The evaluation can be carried out in particular parallel and/or concatenated, in particular in series. A parallel evaluation of two or more criteria can advantageously increase the reliability of the brake operation. An in-series evaluation of two or more criteria can in particular better control the closing and/or opening of a brake. A parallel evaluation can in particular be implemented by an "OR" conjunction of the criteria, serial evaluation then by an "AND" conjunction of the criteria.

According to a preferred embodiment, at least one criterion, which is evaluated for the closing and/or opening of the brake, is modified during the manipulator process. The modification of the criterion is preferably controlled by a learning process, which is carried out in particular in the manipulator controller and/or on an external device. It is particularly preferably, if a time, especially a pause time is determined as a result of a machine learning process. In particular, the learning process can monitor one or more manipulator processes, and on the basis of the observed manipulator processes estimate a length of a future time interval. The modification of the criterion can be driven both by event-driven, especially by a new existing learning result, and/or periodically and/or continuously driven. The modification of a criterion during the manipulator process can especially result in the advantage that redundant information within the trajectory, e.g., similar, in particular the same stop phases, can be used to improve the efficiency, and in particular without the need to know in advance the duration of the stop phase.

In a preferred embodiment, a safety device monitors and/or controls the opening and/or closing of the brakes in safe technology. The architecture of the control of one or more brakes, preferably at a safety integrity level as specified, for example, in IEC 61508 or EN ISO 13849 satisfies this requirement. A safe brake control offers the advantage of a secure operation stop, in particular of one or more axes, and preferably of the entire manipulator. A safe operating stop may be necessary for certain manipulator processes, in particular if they have interaction with one or more people.

Other advantages and features will become apparent from the dependent claims and embodiments. This is shown, in part schematically as follows:

Figure 1:
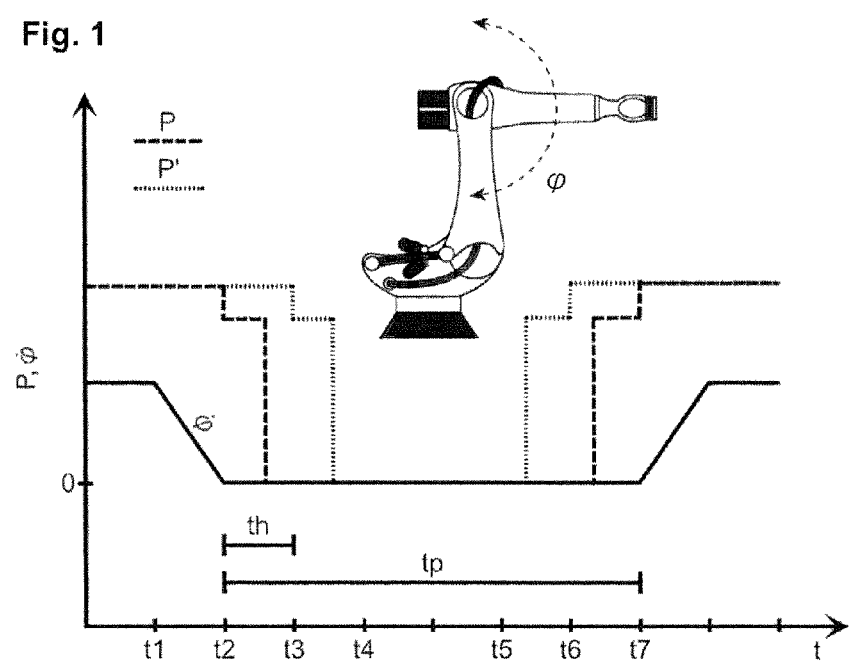
FIG. 1 shows the timing of the speed and the power requirements of an exemple trajectory of a manipulator process according to an embodiment of the present invention.

FIG. 1 shows a section of a trajectory of a manipulator process that is carried out by an industrial robot, wherein the velocity versus time is shown, as well as two different power curves P and P''' according to two time criteria. Until the time t=1, the axle 3 of the robot moves with a positive, constant speed $\phi$>0. At time t1, a stop is commanded and the speed of the axle 3 linearly decreases to $\phi$=0. From the time $t_2$, the axle 3 of the robot is at a standstill.

The first time criterion uses the stop time $t_h$ for the decision to activate and/or deactivate the brakes and the motor. The power curve is illustrated by the dotted line. After the stop time $t_h$ elapses, the safety brake of the robot is switched on at t3 without electrical energy, and it opens. As a result, at time $t_3$, the power consumption P of axle 3 is relatively reduced by the power P' necessary for opening the brake. After the closing of the brake, the motor is also switched without electrical energy. Thus, the complete drive unit of the axle 3 of the robot is without electrical energy. No energy is received until the activation of the power supply for the motor. At time $t_6$, the brakes are released, which leads to a corresponding increase in the power demand P', and the holding torque is again applied by the motor during t>$t_6$ and t<$t_7$. The new motion phase starts at time $t_7$, since which the speed of the axle 3 again linearly increases.

The second criterion uses the pause time interval $t_p$ for the decision to activate and/or deactivate the brakes and the motor and/or off. The power curve is illustrated by the dotted line. The closing of the brake of the axle 3 is synchronized with the entire pause time $t_p$ of the industrial robot. The brake is closed at time $t_2$ and reopened only at time $t_7$. After checking the proper closing of the brakes, the power supply is to the motor is subsequently interrupted. Until the power is back on, the axle 3 is held solely by the brake. The energy supply of the motor is activated again at time $t_6$.

The time criteria shown are preferably combined with other criteria, for example signal criteria and/or state criteria. In preferred embodiments not shown, the decision to close and/or open the brakes depends on one or more signal criteria and/or one or more state criteria. In particular, signal and/or state criteria can be combined.

Figure 2:
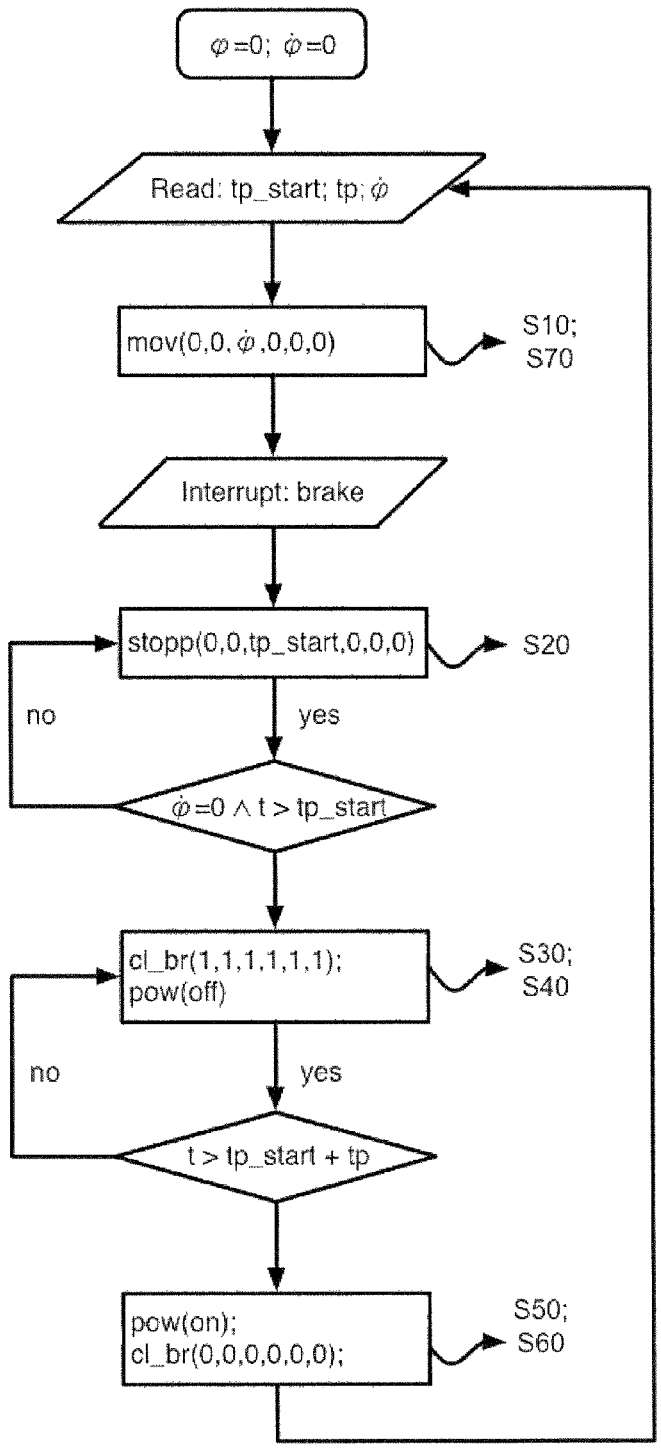
FIG. 2 shows the sequence of a method for the control of a manipulator according to an embodiment of the present invention.

FIG. 2 shows a flowchart of a manipulator process with parameterized brake control to improve the efficiency of the manipulator process. The manipulator is initially in a position, in which the deflection of the axle is 3 zero, $\phi$=0, and the speed is also zero, &=0. First, a parameterization of a pause occurs by the start point in time tp_start and the duration of the pause tp. Moreover, the motion speed & is read. Thereafter, the axle 3 of the robot is moved by the function mov ( ). Upon a signal event (interrupt), a braking operation is commanded by the function stop( ) so that the axle 3 stops at the time tp_start. The brakes are activated, when the speed of the robot is &=0, and the time tp_start is exceeded. After closing the brakes, the power supply is interrupted pow(off). After the pause duration elapses, at first, the power supply is again activated, then the brakes are opened. Thereafter, the parameters are updated and the next motion phase is performed.

LIST OF REFERENCE NUMBERS t Time
$t_1$-$t_7$ Absolute time points
$t_h$ Stop time
$t_p$ Pause time
$\phi$ Position of the axle 3 of the manipulator
& Speed of the axle 3
P Power consumption of the axle 3 at the first time criterion
P' Power consumption of the axle 3 at the second time criterion

The invention claimed is:
1. A method for performing a manipulator process, which comprises at least two manipulator poses, by a manipulator, in particular a robot, which comprises at least one drive means having a motor and a brake, comprising the steps of:
Assuming a manipulator pose;
Stopping at least one drive after reaching the manipulator pose;
Closing at least one brake of this drive;
Reducing the energy supply to the drive;
determining whether a pause duration has lapsed after reducing energy supply to the drive;
Increasing the energy supply to the drive;
Opening the closed brake; and
Assuming another manipulator pose.
2. The method according to claim 1, further comprising:
repeating the steps of stopping, closing, reducing determining, increasing, opening, and assuming another manipulator pose.

3. The method according to claim 1, wherein the brake is closed and/or opened on the basis of at least one the following criteria:
- a time criterion;
- a signal criterion; or
- a state criterion.

4. The method according to claim 3, wherein the brake is closed and/or opened on the basis of at least two of the criteria.

5. The method according to claim 3, wherein a time criterion based on at least one of the following times is prescribed:
- an absolute time;
- a process time;
- a stop time since the stopping; or
- a time interval between the stop and the opening of the brake.

6. The method according to claim 3, wherein a signal criterion based on at least one of the following signals is prescribed:
- a signal of a manipulator control system;
- a signal of a manipulator process;
- a signal of a tool control system;
- a signal of a control station; or
- a signal of a device from the environment of the manipulator, which cooperates with the manipulator.

7. The method according to claim 3, wherein a state criterion based on at least one of the following conditions is prescribed:
- a state of the manipulator;
- a state of a manipulator control system;
- a state of a manipulator process;
- a state of a tool of the manipulator;
- a state of a control station; or
- a state of a device from the environment of the manipulator, which cooperates with the manipulator.

8. The method according to claim 3, further comprising:
- changing at least one criterion during the manipulator process.

9. The method according to claim 1, wherein at least one more drive means of the manipulator is moving, while the brake is closed.

10. The method according to claim 1, wherein closing at least one brake comprises reducing a power supply to the brake.

11. The method according to claim 1, further comprising:
- monitoring the opening and closing of the brake with a safety device.

12. An apparatus for controlling a manipulator, in particular a robot, the apparatus comprising a storage medium including program code that, when executed by the apparatus, causes the apparatus to:
- move the manipulator to assume a manipulator pose;
- stop at least one drive after reaching the manipulator pose;
- close at least one brake of the drive;
- reduce the energy supply to the drive;
- determine whether a pause duration has lapsed after reducing energy supply to the drive;
- increase the energy supply to the drive;
- open the closed brake; and
- move the manipulator to assume another manipulator pose.

13. A computer program product having programming code stored on a non-transitory machine-readable data medium, the programming code configured to, when executed by a computer, cause the computer to:
- move a manipulator to assume a manipulator pose;
- stop at least one drive after reaching the manipulator pose;
- close at least one brake of the drive;
- reduce the energy supply to the drive;
- determine whether a pause duration has lapsed after reducing energy supply to the drive;
- increase the energy supply to the drive;
- open the closed brake; and
- move the manipulator to assume another manipulator pose.

14. The method of claim 8, wherein changing at least one criterion during the manipulator process comprises adapting the criterion.

15. The method of claim 10, wherein reducing the power supply to close the at least one brake comprises interrupting the power supply.

* * * * *